United States Patent
Ondruschka et al.

(10) Patent No.: US 6,717,119 B2
(45) Date of Patent: Apr. 6, 2004

(54) DEVICE FOR PERFORMING MULTIPLE CHEMICAL REACTIONS AND PROCESSES IN HIGH FREQUENCY FIELDS

(75) Inventors: Bernd Ondruschka, Leipzig (DE); Matthias Nüchter, Leipzig (DE); Werner Lautenschläger, Leutkirch (DE)

(73) Assignee: Milestone S.r.l., Sorisole (IT)

( * ) Notice: Subject to any disclaimer, the term of this patent is extended or adjusted under 35 U.S.C. 154(b) by 142 days.

(21) Appl. No.: 10/050,782

(22) Filed: Jan. 18, 2002

(65) Prior Publication Data

US 2002/0084264 A1 Jul. 4, 2002

(51) Int. Cl.⁷ .................................. H05B 6/80
(52) U.S. Cl. ........................ 219/679; 219/762
(58) Field of Search ................... 219/679, 762, 219/705, 704, 744, 752, 759, 678, 686, 687, 718, 710, 697, 696, 711, 754; 422/102, 79, 112, 113; 204/157.15, 157.3, 157.6, 156; 374/150, 110; 73/863.11; 436/55

(56) References Cited

U.S. PATENT DOCUMENTS

| | | | | |
|---|---|---|---|---|
| 3,427,422 A | * | 2/1969 | Muller | 219/710 |
| 4,571,474 A | * | 2/1986 | Pomroy | 219/753 |
| 4,659,890 A | * | 4/1987 | Viet | 219/753 |
| 4,714,813 A | * | 12/1987 | Trenchard | 219/753 |
| 5,077,066 A | * | 12/1991 | Mattson et al. | 426/234 |
| 5,369,034 A | * | 11/1994 | Hargett et al. | 436/155 |
| 5,938,968 A | * | 8/1999 | Ogg et al. | 219/763 |

FOREIGN PATENT DOCUMENTS

DE  4325667 A1  2/1995

OTHER PUBLICATIONS

Ian C. Cotterill, et al. "Microwave Assisted Combinatorial Chemistry Synthesis of Substituted Pyridines", Tetrahedron Letters 39 (1998), pp. 1117–1120.

* cited by examiner

Primary Examiner—Quang T. Van
(74) Attorney, Agent, or Firm—Fitzpatrick, Cella, Harper & Scinto

(57) ABSTRACT

A magazine-type sample rotation body (7) is arranged in a high frequency chamber (5) so that it rotates away from the horizontal, the body (7) accommodating, in fixed location, reactor blocks (10) that are sealed or sealable from fluids such that fluids contained in sample vessels in the reactor blocks can be mixed before, during and after high frequency exposure because of the rotational movement of the sample rotation body.

25 Claims, 2 Drawing Sheets

DEVICE FOR PERFORMING MULTIPLE CHEMICAL REACTIONS AND PROCESSES IN HIGH FREQUENCY FIELDS

BACKGROUND OF THE INVENTION

1. Field of the Invention

The invention concerns a device for performing chemical reactions and processes in high frequency fields.

It allows the advantageous introduction of energy and carrying out of disintegration, hydrolysis, chemical synthesis, extraction and drying as well as other reactions and processes under the effect of high frequency.

2. Description of the Related Art

For the running, acceleration and/or initiation of chemical reactions and processes an introduction of energy is often needed. For this purpose the reaction mixtures, are arranged, for example, in a microwave system with a radiation-screened housing in reaction containers that allow microwaves to pass through them, and energy is introduced through radiation with microwaves. Since with the reactions and processes that take place high pressures often result or the reactions only run under pressure, the entire arrangement must be stable under pressure and, for example, have a locking cover system. In general the reaction vessels are also fitted with safety or control devices, in order to be able to monitor the running of the chemical reactions and processes.

Equipment arrangements for the introduction of thermal energy in disintegration, hydrolysis, chemical synthesis, extraction, drying and other reactions and processes have been extensively described, but also have the likewise known disadvantages such as long heating and/or reaction times, limited or poor pressure and/or temperature stability and a lack of flexibility of the individual arrangements. Furthermore and as a rule, only reactions and processes in individual vessels, or a small number of parallel reactions, are possible. The stated disadvantages have in part been overcome by the use of high frequency energy to activate chemical reactions and processes, but here also there are limits on the number of sample vessels. Patent DE 43 25 667 A1 describes a device that allows the execution of six, eight or ten reactions simultaneously. Here the sample vessels with the samples are placed individually on a horizontal rotating table, secured to this, and moved on it in the plane of the table through the microwave field. This type of sample preparation requires, compared with the actual reaction time, long set-up times and in many cases involves a danger of misanalysis, since in particular because of the extensive time-consuming sample preparation the waiting times of the individual reaction mixtures can differ greatly. In these cases the assessment of the microwave radiation on the samples is only comparable to a limited extent and in practice can lead to not inconsiderable misinterpretations. The structural shape of the reactor system does not allow automated sample preparation that, with parallel syntheses in particular, leads to a large amount of time spent on sample preparation with high error rates. Genuinely high throughput screening is not possible with these reactor systems for the stated reasons.

In Tetrahedron Lett. 1998, 39, 1117–1120 the use of simple multi-corrugated plates in a domestic microwave unit is described. The use of these corrugated reactors for parallel synthesis in the microwave field is, however, associated with technical shortcomings such as a lack of pressure stability, low temperature stability of the reactor materials, poor energy distribution and associated variations in temperatures in the individual reactors as well as consistent temperature and concentration gradients in the individual reaction mixtures. It can be assumed that the stated weak points lead to a number of misconceptions during material screening.

SUMMARY OF THE INVENTION

The object of the invention is to fashion, with the least possible effort, a practical device with which a number of chemical reactions and processes in high frequency fields can be carried out under an improved and in each case extensively the same high frequency effect on the individual reactions and processes. In particular, misconceptions in material screening that can occur due to sample specifics such as temperature and concentration gradients, as well as shortcomings of the device and its application, should be avoided.

The invention envisages a magazine-type sample rotation body in the high frequency chamber arranged so that it rotates away from the horizontal, for the stacked, fixed-location accommodation of liquid- and gas-tight sealed or sealable, or single- or multiple, reaction blocks. These are pushed into the sample rotation body and with this are moved around their axis of rotation in a quasi "overhead" manner. Here the reactor blocks can each be stacked individually in the sample rotation body, or reactor blocks already existing in a stack are introduced and secured simultaneously. With the movement of the sample rotation body the individual samples are mixed in order to generate homogenous and comparable state conditions. Furthermore, the reactor blocks with the samples to be treated with the high frequency radiation and which have been mixed with the movement are transported through the radiation field(s) so that the radiation can have its influence with the same effect on each of the samples that can be present in quantity for simultaneous treatment. Any inconsistencies in the high frequency fields are thus extensively balanced out in terms of their effect on the radiation treatment of the sample in the multiple chemical reactions and processes. A device is fashioned that is loaded with the minimum of effort and in a short time and can be loaded with a number of reaction mixtures, equipped for high frequency treatment with comparable analytical conditions of the individual samples. Although a number of simultaneous sample reactions can be carried out, nevertheless at the start of and during the high frequency effect for the reaction mixtures essentially comparable sample and treatment conditions are guaranteed, so that misanalyses during material screening are extensively excluded. As a result in particular of the short apparatus set-up time (even for many samples, for example due to automatic sample preparation) during high frequency treatment and preparation for this, the analytical drawbacks of differing sample specifics such as temperature and concentration gradients, can to a large extent be avoided.

As a result of the advantageous low effort, fast and very practical loading, treatment and removal of a number of samples, the preconditions are created for genuinely high throughput screening.

For the reactor blocks preferably sample vessel plates can be used, which in the already known manner exist as corrugated analysis plates with sample vessels incorporated and arranged in a fixed grid or as sample carrier plates with sample vessel inserts. The latter can likewise have the known grid dimension of the sample vessels, so that connection with the advantageous so-called liquid handling technique is possible. The said high throughput screening is also supported by this.

Further advantageous structural designs of the characteristics of the independent claim are described and claimed herein. These concern, for example, the acceptance and the liquid-proof sealing of the reactor blocks with the sample vessels.

BRIEF DESCRIPTION OF THE DRAWINGS

The invention will be explained in more detail in the following using an embodiment that is illustrated in the drawings. These drawings are as follows.

DETAILED DESCRIPTION OF THE PREFERRED EMBODIMENT

Figure 1:
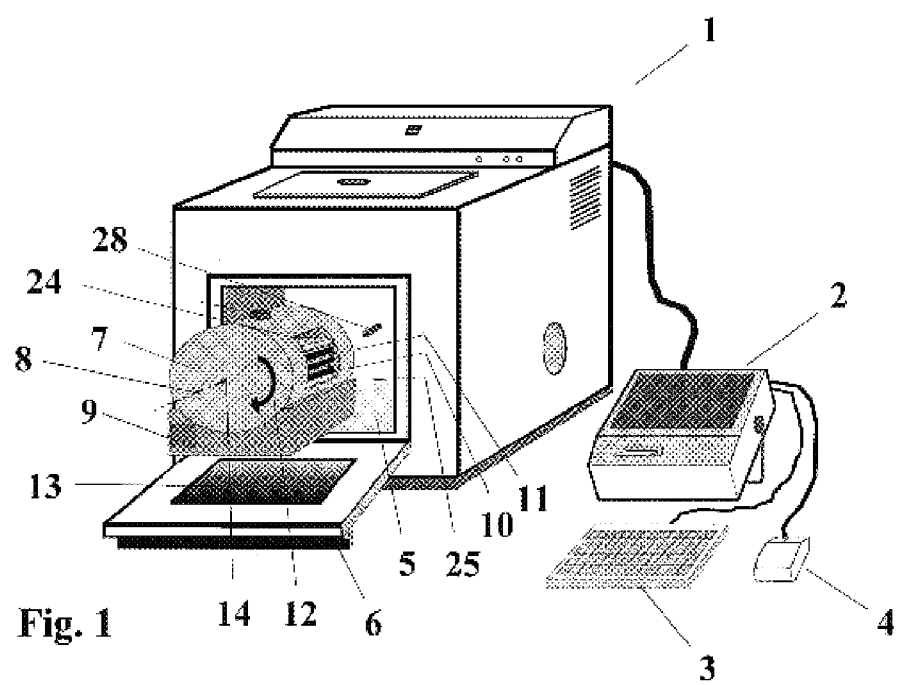
FIG. 1: General view of a microwave treatment system with sample rotation body in the microwave chamber

FIG. 1 is a schematic view of a microwave treatment system for performing multiple chemical reactions and processes. A high-frequency oven 1, that is controlled via a controller 2 with a keyboard 3 or mouse 4, has a microwave chamber 5 with one or more not explicitly shown microwave emitters. The microwave chamber 5 is accessible from the outside via a front flap 6. In the microwave chamber 5 a sample rotation body 7 is arranged, that runs on a drive controller, which for clarity of the drawing is not shown in FIG. 1, to perform a rotation movement (in principle comparable with a rotating tubular kiln) around an axis 8. This sample rotation body 7 incorporates a magazine-like reactor system, which when the front flap 6 of the microwave chamber 5 is opened or via a slide 9 can be withdrawn from the microwave chamber 5. In the withdrawn state of the slide 9 the sample rotation body 7 can be loaded with the reactor blocks in the form of sample vessel plates 10, which are sealed with silicon PTFE films 11, or the microwave treated sample vessel plates 10 can be removed from the sample rotation body 7 again. During the microwave treatment of the sample liquid- and gas-tight vessel plates 10 that are fitted in the sample rotation body 7 in a magazine-like manner, these are, as shown by a rotating arrow 12, moved around the axis 8 of the reactor system in the microwave chamber 5 in a quasi overhead manner.

The microwave treatment can be visually monitored via a window 13 in the front flap 6 and thermally via a temperature sensor 14.

Figure 2:
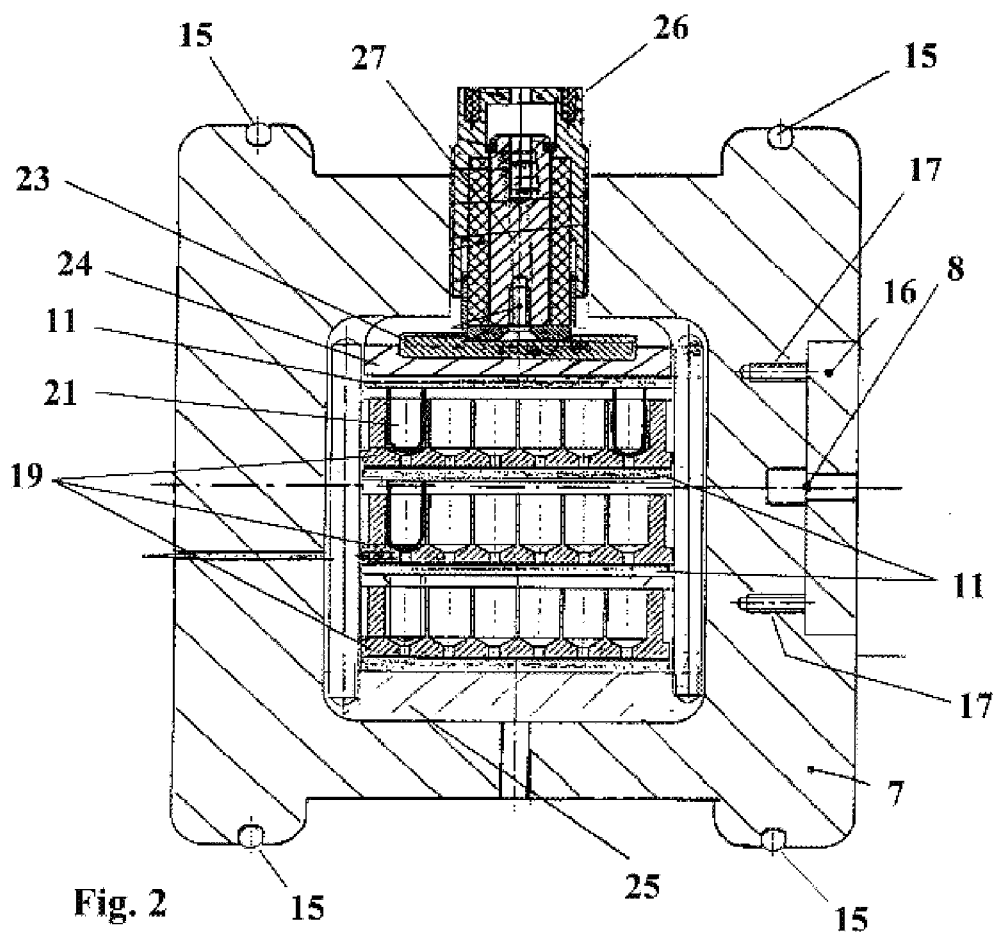
FIG. 2: Sample rotation body in side view (cutaway view)
Figure 3:
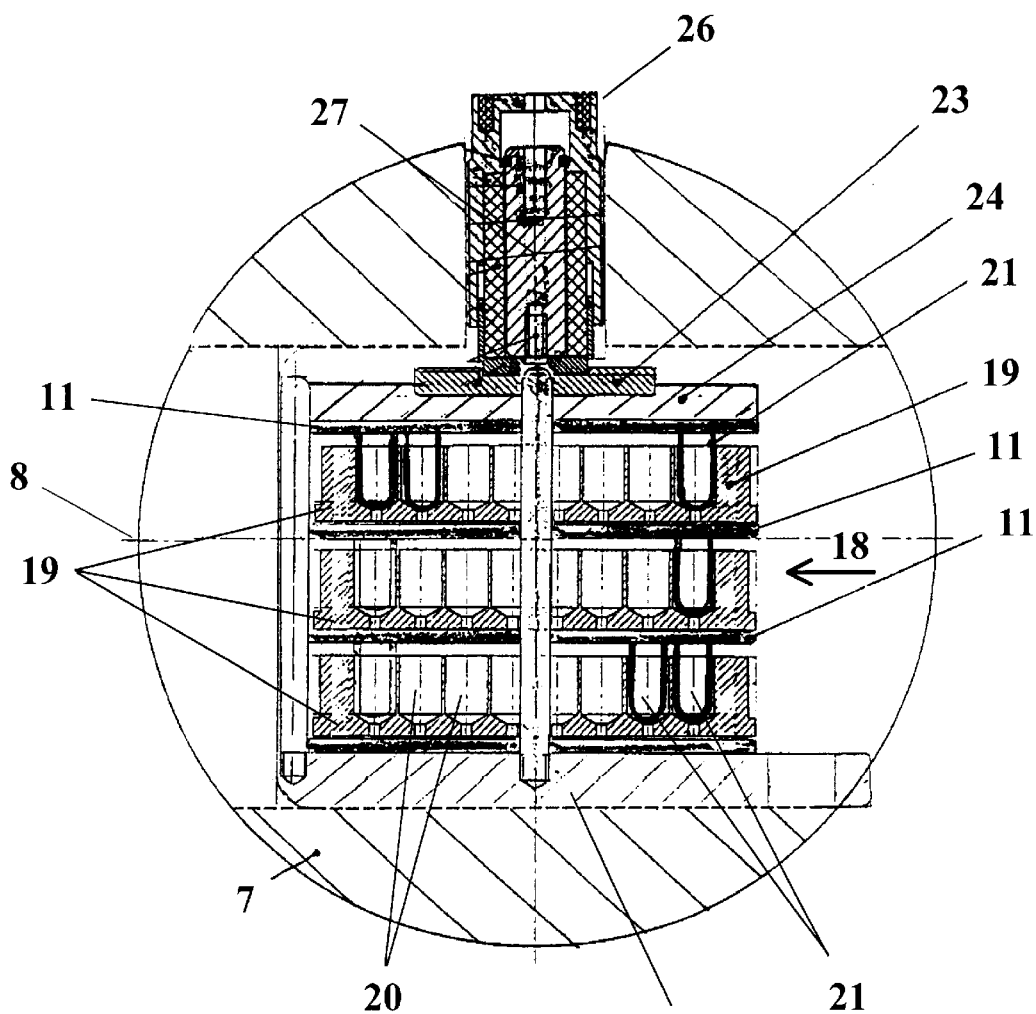
FIG. 3: Sample rotation body in axial view (cutaway view)

FIGS. 2 and 3 show in detail the sample rotation body 7 as a cross-section in the direction of the axis 8 (FIG. 2) and as a cross-section transversally to this (FIG. 3).

The sample rotation body 7 is supported in a rotating manner via ball or roller bearings 15 on bearing surfaces, not shown in FIG. 2 for the purposes of clarity, of the slide 9 in the microwave chamber 5 to rotate around the axis 8. To allow its rotational movement, on its rear side (looking from the front flap 6 outwards) a coupling receiver 16 and driving holes 17 are provided as drive elements.

In order to accept the sample vessel plates 10 the sample rotation body 7 has an insertion opening 18 (see FIG. 3) with respective guide elements that are not illustrated to set the position, for example guide rails and stops. A design solution would also be conceivable in which the insertion opening 18 is accessible from both sides in the sample rotation body 7.

In this insertion opening 18 in the withdrawn state of the slide 9 (see FIG. 1), as shown for example in FIGS. 2 and 3 for three sample vessel plates 10, one or more sample vessel plates 10 are stacked and retained therein. Here the plates can be introduced one after another or as a stack into the insertion opening 18.

For the sample vessel plates 10 in the embodiment in FIGS. 2 and 3, holed plates 19, for example in microwave-absorbing plastic, like WEFLON, are shown in whose locating holes 20 vessel inserts 21 are inserted as individual reactor vessels with a set or freely selectable size, preferably in a grid that can be adapted to the liquid handling technique, e.g. 8×12.

Figure 4:
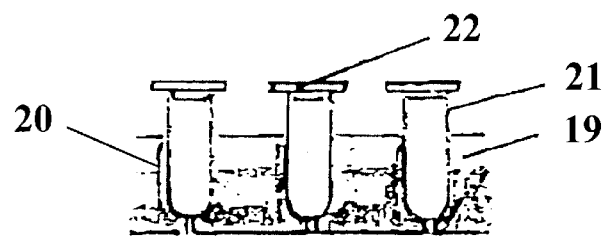
FIG. 4: Holed plate with vessel inserts as reactor block in the sample rotation body

The vessel inserts 21 can, for example, be secured in the holed plates 19 by pressure or bonding and depending on the design and the application may comprise, by way of example; glass, quartz or plastic. Here they will be introduced in such a way that their top edges are essentially flush with the top edges of the holed plates 19 and thus allow a pressure resistant seal. FIG. 4 shows the detail of such an arrangement of a holed plate 19 with individual vessel inserts 21, which in each case are closed with a cover 22, preferably consisting of PTFE, and/or sealed with a common silicon PTFE film 11. In place of the cover 22 the vessel inserts 21 can also be sealed individually and independently of the silicon PTFE film 11 (for example by film or silicon seal).

A pressure-resistant seal of the vessel inserts 12, which not least also brings about the locking in position for the movement of the sample rotation body 7, is achieved by means o platens 23, 24 pressing against a base plate 25. In this way the flexible intermediate film layers (silicon PTFE films 11) are brought into contact positively and non-positively respectively, on the one hand with the top edges of the holed plates 19 or the vessel insert 21 or their covers, and on the other with the bottom edges of the holed plates 19 or their platen 24. For the application force a pressure screw 26 that is accessible from the outside; see FIG. 1) is used with a linear spring 27, which works on the platens 23 and 24. The apparatus set-up time is limited to the magazine loading and fixing of the sample vessel plates 10 on the sample rotation body 7.

The sample vessel plates 10 (in the embodiment in FIGS. 2–4 holed plates 19 with vessel inserts 21) which are in this way secured in position as a stack which is pressure resistant and liquid- and gas-tight in the sample rotation body 7 are, following pushing in of the slide a (see FIG. 1), within the sealed microwave chamber 5 and in the sample rotation body 7 moved together around the axis 8 of this through the microwave field, whereby the samples contained in the sample vessel plates 10 with this overhead movement of the sample vessels, are mixed. On the one hand in each of the individual samples homogenous state conditions that are comparable with each other are thus created, and on the other through the localized change of position of the sample vessels any local inconsistencies in the microwave field are to a large extent balanced out.

The rotary movement drive of the sample rotation body 7 is symbolized in FIG. 1 by a drive pin 28, which when the slide 9 is introduced engages in one of the driving holes 17 (see FIG. 2) on the rear of the sample rotation body 7 shown in FIG. 1 and moves this in the direction of the rotating arrow 12.

What is claimed is:

1. Device for performing multiple chemical reactions and processes in high frequency fields, said device comprising:
    a high frequency chamber in which several sample vessels are simultaneously exposed to the effect of one or more high frequency fields;

a magazine-like sample rotation body arranged in said high frequency chamber in a manner such that it rotates away from the horizontal, said rotation body accommodating said sample vessels and causing same to be moved around their axis in a quasi overhead manner.

2. Device according to claim 1, wherein said reactor blocks are provided with sample vessel plates in which said sample vessels are located.

3. Device according to claim 2, wherein said vessel plates comprise carrier plates that can be loaded with individual sample vessel inserts.

4. Device according to claim 3, wherein said carrier plates comprise holed plate having holes for accommodating said individual sample inserts, said holes being arranged in a grid.

5. Device according to claim 3, wherein said carrier plates are made of a microwave absorbing plastic.

6. Device according to claim 3, wherein said sample vessel inserts are made of glass, quartz or plastic.

7. Device according to claim 2, wherein said sample vessel plates are corrugated analysis plates each having a grid of sample vessels.

8. Device according to claim 2, wherein said sample vessels are sealed.

9. Device according to claim 1, wherein the sample vessels of each reactor block are sealed with film.

10. Device according to claim 1, wherein the sample vessels of the reactor block are sealed by vessel covers.

11. Device according to claim 1, wherein the sample vessels of the reactor blocks are retained, by means of additional sealing elements, with a tight seal in the reactor blocks during the rotating movement of the sample rotation body.

12. Device according to claim 11, wherein the additional sealing elements each comprise a platen for the respective reactor block.

13. Device according to claim 12, wherein said platens have a flexible bearing surface.

14. Device according to claim 1, wherein the reactor blocks are locked in position by clamping elements.

15. Device according to claim 14, wherein the clamping elements each comprise a pressure screw with linear spring.

16. Device according to claim 1, wherein the sample rotation body employs driving holes, drive pins, toothed wheels or coupling elements, for the rotational movement.

17. Device according to claim 1, further including a slide into which the sample rotation body in the high frequency chamber can be inserted for receiving or removal of the reactor blocks.

18. Device for performing multiple chemical reactions and processes in high frequency fields, said device comprising:
- a high frequency chamber in which several sample vessels are simultaneously exposed to the effect of one or more high frequency fields;
- a magazine-like sample rotation body arranged in said high frequency chamber in a manner such that it rotates away from the horizontal, said sample rotation body accommodating sealable reactor blocks which contain said sample vessels,
- said reactor blocks being provided with sample vessel plates in which said sample vessels are located.

19. Device according to claim 18, wherein said vessel plates comprise carrier plates that can be loaded with individual sample vessel inserts.

20. Device according to claim 19, wherein said carrier plates comprise holed plates having holes for accommodating said individual sample vessel inserts, said plates having holes which are arranged in a grid.

21. Device according to claim 19, wherein said carrier plates are made of a microwave absorbing plastic.

22. Device according to claim 19, wherein said sample vessel inserts are made of glass, quartz or plastic.

23. Device according to claim 18, wherein said sample vessel plates are corrugated analysis plates each having a grid of sample vessels.

24. Device according to claim 18, wherein said sample vessels are sealed.

25. Device for performing multiple chemical reactions and processes in high frequency fields, said device comprising:
- a high frequency chamber in which several sample vessels are simultaneously exposed to the effect of one or more high frequency fields;
- a magazine-like sample rotation body arranged in said high frequency chamber in a manner such that it rotates away from the horizontal, said sample rotation body accommodating sealable reactor blocks which contain said sample vessels,
- wherein the sample vessels of the reactor blocks are retained, by means of additional sealing elements, with a tight seal in the reactor blocks during the rotating movement of the sample rotation body,
- wherein the additional sealing elements each comprise a platen for the respective reactor block, and wherein
- the platens have a flexible bearing surface.

* * * * *